Aug. 24, 1965 R. L. KING, JR., ETAL 3,202,809

ANALOG MULTIPLICATION AND DIVISION CIRCUIT
USING A HALL EFFECT MULTIPLIER

Filed March 21, 1962 2 Sheets-Sheet 1

RAYMOND L. KING, JR.
ROBERT L. CONGER
*INVENTORS*

BY J. M. St. Amand

ATTORNEY

RAYMOND L. KING, JR
ROBERT L. CONGER
*INVENTORS*

*BY* J. M. St. Amand

ATTORNEY

United States Patent Office 3,202,809
Patented Aug. 24, 1965

3,202,809

ANALOG MULTIPLICATION AND DIVISION CIRCUIT USING A HALL EFFECT MULTIPLIER

Raymond L. King, Jr., and Robert L. Conger, Riverside, Calif., assignors to the United States of America as represented by the Secretary of the Navy Filed Mar. 21, 1962, Ser. No. 181,492
1 Claim. (Cl. 235—196)
(Granted under Title 35, U.S. Code (1952), sec. 266)

The invention herein described may be manufactured and used by or for the Government of the United States of America for governmental purposes without the payment of any royalties thereon or therefor.

The present invention relates to electronic analog computers and more particularly to a new and improved analog divider circuit.

Previously electronic analog computers for solving division were large, utilized many electronic tubes, involved transistorized circuits, or had the disadvantage of very limited range and low level output. In the analog divider of the present invention, the division is performed by using a reciprocal generator, which consists of two or more diodes and a resistance network, and a function generator plus a Hall effect multiplier.

It is an object of the invention to provide a new and improved electronic analog division circuit.

Another object of the invention is to provide an electronic analog computer for solving division using D.C. input voltages.

A further object of the invention is to provide new and improved analog divider circuitry that is small, rugged, relatively simple, and has an obtainable linearity of better than one percent.

Still another object of the invention is to provide a new analog computer circuit which multiplies two approximated functions to obtain an output function.

Other objects and many of the attendant advantages of this invention will become readily appreciated as the same becomes better understood by reference to the following detailed description when considered in connection with the accompanying drawings wherein.

Figure 1:
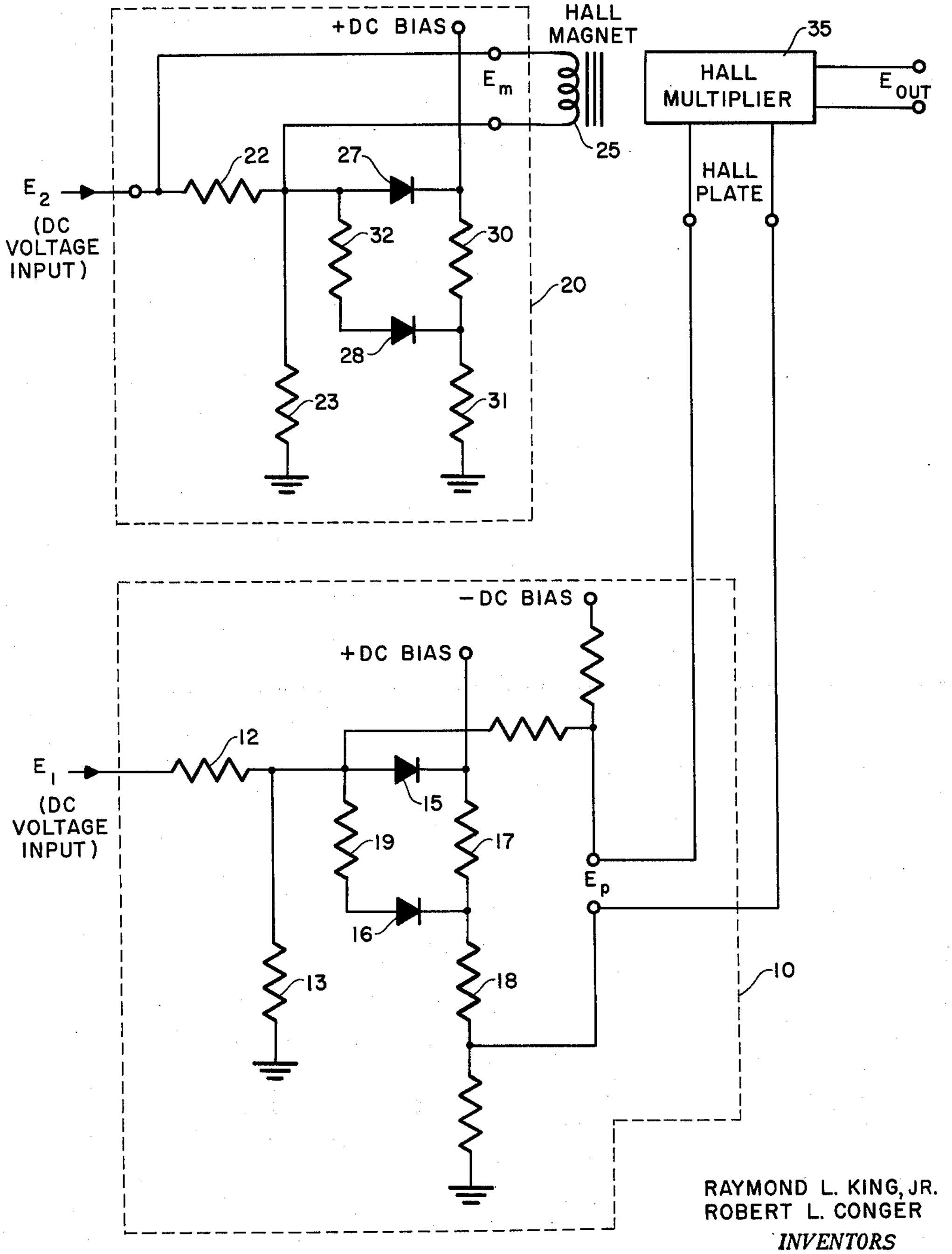
FIG. 1 is a circuit diagram of an embodiment of the invention.
Figure 2:
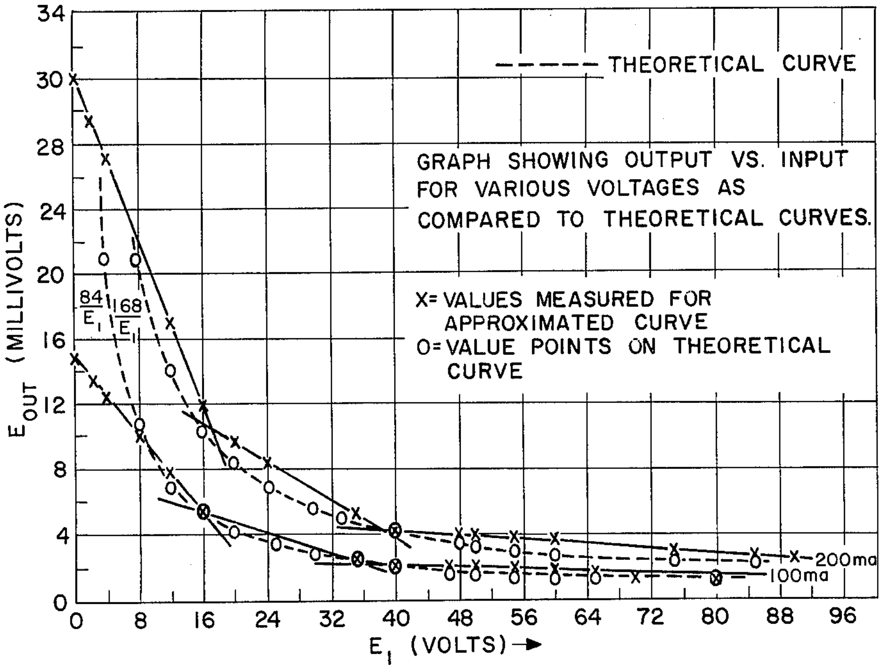
FIG. 2 is a graph showing output vs. input for various voltages as compared to theoretical curves; where the *o*'s represent value points on the theoretical curves and *x*'s represent actual measured values on the approximated curve.

Referring to the circuit diagram of FIG. 1, the diode network within the dashed line 10 is a reciprocal generator. Basically, the reciprocal generator 10 is a voltage divider working into a pair of biased diodes, the diodes being biased through a resistance network so that the operating point is shifted on the diode characteristic curve. A voltage $E_1$ is applied to reciprocal generator 10 across resistors 12 and 13; as tthe voltage $E_1$ increases diode 15 and then diode 16 start to conduct and connect resistors 17, 18 and 19 into the network. (An example of values for resistors 12, 13, 17, 18 and 19 is 2K, 2K, 51, 51 and 300 ohms respectively.) By arranging the resistors and diodes properly and applying proper voltages, a straight line approximation to a reciprocal curve can be produced. The number of straight lines is proportional to the number of diodes used and can be increased any arbitrary amount to approach more closely the theoretical curve shown on the graph of FIG. 2 showing the output vs. the input for various voltages. The numbers 84 and 168 represent a particular value of $E_2$.

The diode network within dashed line 20 of FIG. 1 is a function generator and is similar to the network of reciprocal generator 10. A voltage $E_2$ is applied across resistors 22 and 23 of function generator 20; the voltage drop is mostly across the larger resistor 23 for low voltages. Function generator 20 produces an output voltage $E_m$; this output voltage is applied across field coil 25 of the Hall magnet and increases linear approximation with input voltage $E_2$. As diodes 27 and 28 start to conduct more of the voltage drop is across resistor 22 increasing the output $E_m$, and the output increases with input $E_2$. (An example of values for resistors 22, 23, 30, 31 and 32 is 100, 2K, 51, 151 and 300 respectively.)

Figure 3:
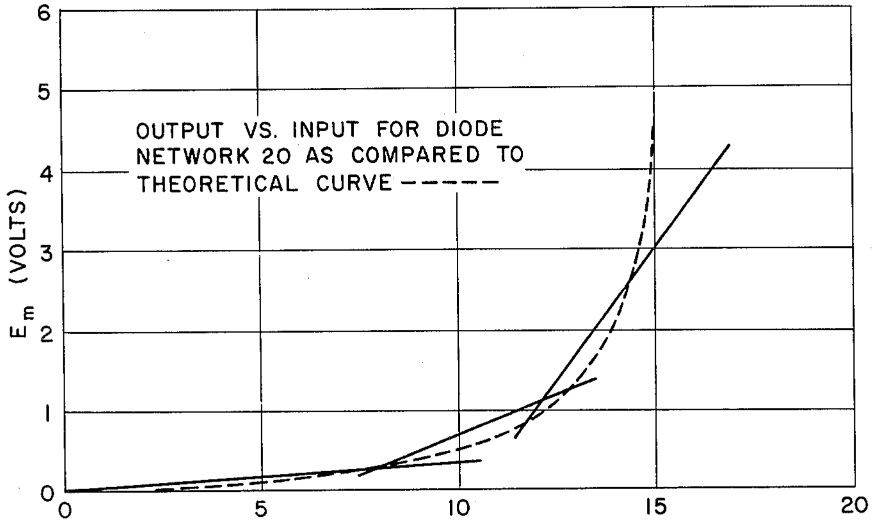
FIG. 3 is a graph showing output vs. input for the function generator.

FIG. 3 shows output vs. the input for function generator 20 as compared to the theoretical curve. Both networks 10 and 20 deviate most from the theoretical curves in regions where the theoretical curves become very steep.

It has been found that with only two diodes a fair approximation to a reciprocal curve can be produced. The input voltages $E_1$ and $E_2$ are D.C. and since relatively high impedances are used, the circuit consumes little power. The output $E_p$ of the reciprocal generator 10 is applied across the plate of Hall effect multiplier 35 and the output $E_m$ is applied to the magnetic field coil 35 of the Hall effect multiplier.

The Hall effect multiplier 35 is a well known device capable of fairly accurate multiplication of two electrical quantities; the electrical quantities being a current through a semiconductor plate (the Hall plate) and a magnetic field which in turn is derived from a current through a magnetic field winding 25. The presence of a magnetic field causes the charge carriers in the semiconductor plate to be deflected to the edge and build up a potential normal to both the magnetic field and the current producing potential. This Hall potential is detected as $E_{out}$. Several desired features of the Hall multiplier is that it is small, rugged, relatively simple, a linearity of better than 1% is obtainable and frequency response is virtually unlimited allowing it to work from D.C. to a megacycle per second.

Function generator 20 drives the Hall electromagnet 25 without any amplification. This circuit provides a dynamic range greater than ten with reasonable accuracy. The accuracy of the networks 10 and 20, and thus of the overall circuit, can be improved arbitrarily by incorporating more resistors and diodes therein. Accuracy of the Hall effect multiplier is better than 1%. The present device using diode reciprocal networks and a Hall effect multiplier is much more accurate than other known methods.

Magnetoresistance elements may be a possible substitute for Hall effect multipliers. The availability of high impedance magnetoresistance elements will permit a magnetoresistance divider to be produced having considerable accuracy and D.C. inputs.

Obviously many modifications and variations of the present invention are possible in the light of the above teachings. It is therefore to be understood that within the scope of the appended claim the invention may be practiced otherwise than as specifically described.

What is claimed is:

An electronic analog computer circuit for obtaining as an output function the product of two variables comprising:

(a) a Hall effect multiplier for multiplication of two electrical quantities, including a Hall plate, an electromagnet field winding, a pair of plate terminals and a pair of output terminals;

(b) a function generator having its output connected across the magnetic field winding of said Hall effect multiplier, said function generator driving said magnetic field winding without any amplification and providing a dynamic range greater than ten with acceptable accuracy;

(c) a first variable D.C. input voltage applied across the input of said function generator;

(d) a reciprocal generator having its output connected across the plate terminals of said Hall effect multiplier;

(e) a second variable D.C. input voltage applied across the input of said reciprocal generator;

(f) said function generator comprising a voltage divider having a plurality of diodes biased through a resistance network connected across a greater resistance portion therof and having its output taken from across the smaller resistance portion thereof whereby the greater voltage drop will be across the greater resistance portion of the divider until the diodes commence to conduct thus causing the voltage drop across the smaller resistance portion of the divider to increase in a piecewise linear approximation to a reciprocal curve with said first input voltage;

(g) said reciprocal generator consisting of a voltage divider working into a plurality of diodes that are biased through a resistance network whereby the output voltage from the reciprocal generator is a straight line approximation to a reciprocal curve of said second input voltage;

(h) the output of said Hall effect multiplier being a function of the output of said reciprocal generator multiplied by the output of said function generator.

References Cited by the Examiner

UNITED STATES PATENTS

| | | | |
|---|---|---|---|
| 2,895,046 | 7/59 | Martin. | |
| 2,956,209 | 10/60 | Kuhrt et al. | 324—45 X |
| 3,003,698 | 10/61 | Kuhrt et al. | 235—196 |
| 3,024,997 | 3/62 | Sun | 235—194 |
| 3,110,802 | 11/63 | Ingham et al. | 235—197 |

OTHER REFERENCES

Pages 192 and 193, 1942, James et al., Mathematics Dictionary, The Digest Press.

Page 233, 1952, Korn et al., Electronic Analog Computers, McGraw-Hill Book Co., Inc.

MALCOLM A. MORRISON, *Primary Examiner.*